United States Patent [19]

Walles

[11] Patent Number: 4,615,914
[45] Date of Patent: Oct. 7, 1986

[54] TREATMENT OF THE INTERIOR SURFACES OF RESINOUS ENCLOSURE MEMBERS

[75] Inventor: Wilhelm E. Walles, Freeland, Mich.

[73] Assignee: The Dow Chemical Company, Midland, Mich.

[21] Appl. No.: 785,305

[22] Filed: Oct. 7, 1985

[51] Int. Cl.$^4$ .......................... B05D 7/22; B05D 5/00; C08F 8/40

[52] U.S. Cl. ................................ 427/237; 427/255.4; 427/400; 525/344

[58] Field of Search ............... 525/344; 427/45.1, 237, 427/255.4, 335

[56] References Cited

U.S. PATENT DOCUMENTS

| | | | |
|---|---|---|---|
| 2,832,696 | 4/1958 | Walles | 427/322 |
| 3,613,957 | 10/1971 | Walles | 427/255.4 |
| 3,770,706 | 11/1973 | Walles | 525/344 |
| 3,940,377 | 2/1976 | Horowitz et al. | 525/344 |
| 4,220,739 | 9/1980 | Walles | 525/344 |
| 4,425,460 | 1/1984 | Makowski et al. | 525/344 |

Primary Examiner—John E. Kittle
Assistant Examiner—James J. Seidleck
Attorney, Agent, or Firm—B. M. Kanuch

[57] ABSTRACT

Plastic containers are treated to provide increased barrier properties to organics and gases such as oxygen by treating the interior surface of the container with $SO_3$ gas. The $SO_3$ gas is provided by inserting a solid pellet of poly-$SO_3$ into the container and evaporating the $SO_3$ such as with microwave energy. A solid neutralizing agent such as ammonium carbonate is then placed into the container and evaporated with microwave energy to form ammonia which neutralizes the sulfonic acid groups on the surface interior of the container.

10 Claims, No Drawings

TREATMENT OF THE INTERIOR SURFACES OF RESINOUS ENCLOSURE MEMBERS

BACKGROUND OF THE INVENTION

The use of resinous organic polymers to fabricate enclosure members (plastic containers) such as bottles, tanks and other containers and other molded articles is well known. Plastic containers which are made from most organic polymers, particularly the dominantly hydrocarbon polymers, are non-electroconductive, are non-adherent to polar materials such as inks, paints, dyes and various polar adhesives and are readily permeated and/or stress cracked or swollen by oleophilic materials such as liquid and gaseous hydrocarbons e.g., solvents, fumes, vapors, benzene, cyclohexane, xylene, chlorinated solvents, and hexane; gasses such as nitrogen, oxygen, helium, hydrogen, carbon dioxide, methane, ethane, propane, butane, freons; fuels such as gasoline, kerosene, fuel oils; oils such as natural fatty oils, lubricating oils, perfumes and agricultural chemicals. Depending on the particular polymer, these materials can adversely affect the container material. For example, natural fatty oils tend to cause stress cracking of polymers formed from olefinic monomers such as polyethylene. As a result of these inherent deficiencies many of such organic polymers must be treated with various agents which impart varying degrees of electroconductivity, adhesion and impermeability. Sulfonation techniques have been developed as one means of treating these polymeric materials to decrease the permeability and protect the polymeric material. Some of these sulfonation techniques are described in the following patents; U.S. Pat. Nos. 2,400,720; 2,937,066; 2,786,780; 2,832,696; 3,613,957; 3,740,258; 3,770,706; and 4,220,739. In U.S. Pat. No. 4,220,739 the sulfonation technique is improved by employing as the sulfonating agent a gaseous mixture comprising sulfur trioxide and a suitably active halogen e.g. chlorine. The teachings of these patents are specifically incorportated herein by reference.

All of these prior sulfonation techniques require the generation of a suitable gaseous sulfonating agent such as, for example, sulfur trioxide. Also, in many of these processes, the sulfur trioxide treated organic resinous container is post-treated with a material which improves the effectiveness of the sulfonation treatment. Neutralization with ammonium, metal ions, as well as epoxidation of the organic polymers employing a suitable organic epoxide have been utilized. These neutralization techniques also many times require the generation of gases.

In those processes employing gaseous treating agents, for example, sulfur trioxide, sulfur trioxide, ammonia, etc., gas generating equipment has been employed to generate mixtures of air and sulfur trioxide or neutralizing agents at the site where sulfonation is to be carried out. In many instances this gas generating equipment requires a capital investment which is as great as all the other equipment required to carry out the sulfonation process. Moreover, this equipment takes up considerable space and requires expert maintenance. Use of such equipment also requires start-up and shut-down procedures.

It would therefore be an improvement in the art-recognized processes of employing gaseous sulfonating compounds to treat the interior of resinous containers if a different method of generating the sulfonating and/or neutralizing gas could be employed. The present invention conderns such an improved method of sulfonating and/or neutralizing the interior surfaces of plastic containers which are made from resinous organic polymers which are capable of being surface treated with a sulfonating gas to improve certain characteristics (e.g., decrease permeability, stress cracking, swelling) of the polymer.

SUMMARY OF THE INVENTION

In the practice of the present invention a material, in particulate form, which, upon heating, forms the desired treating agent e.g., sulfur trioxide gas and/or gaseous neutralizing agent is introduced into the interior of an enclosure member fabricated from a resinous organic polymer and thereafter heated to form the gaseous treating agent e.g., sulfur trioxide, at least a portion of which reacts with the interior surface of the enclosure member to treat (sulfonate or neutralize) the same. The resinous organic polymer is any organic polymer which is capable of being sulfonated when contacted with a sulfonating gas such as sulfur trioxide.

A solid particulate material is employed for the sulfonating treatment, e.g., pellets, encapsulated materials and the like which contain for example solid $SO_3$ can be used. The particulate material may contain absorbed solid $SO_3$ or solid $SO_3$ can be coated with a suitable material such as a fluorocarbon or the like to maintain the $SO_3$ in a form suitable for use for a sufficient period of time. Gaseous $SO_3$ is formed by supplying sufficient heat to the solid $SO_3$ to cause it to vaporize. Heating elements or other activating devices such as radio frequency energy, e.g., microwaves, heated air or the like can be employed.

The sulfonated surface is preferably treated with a suitable material to neutralize the sulfonic acid groups formed on the polymer to prevent the reaction of such groups with materials to be placed in the plastic container. This can be accomplished by contacting the sulfonated surface with a gas or liquid which reacts with the sulfonic acid groups to neutralize them. Ammonia gas is an example of a suitable neutralizing agent. A preferred method is to use a solid material such as ammonium carbonate which when heated by the use of, for example, a heat source or radio frequency energy forms ammonia gas. Other suitable neutralizing agents can aslo be employed.

DETAILED DESCRIPTION OF THE INVENTION

Resinous organic polymers capable of being sulfonated have hydrogen atoms bonded to the carbon groups which are replacable by sulfonic acid groups having the sulfur bonded directly to the carbon atoms. Polytetrafluoroethylene is an example of a polymer which is not sulfonatable since it does not have any replacable hydrogen atoms. Suitable organic polymers include thermosetting plastics such as epoxy resins, phenol formaldehyde resins, urea-formaldehyde resins, silicones, polyurethanes and the like. Most thermoplastic polymers are also suitable and include for example, addition-type homopolymers, copolymers and blends thereof prepared from aliphatic $\alpha$-mono-olefins, aliphatic conjugated and non-conjugated dienes, trienes, polyenes, halogenated aliphatic olefins, $\alpha,\beta$-ethylenically unsaturated carboxylic acids, vinylesters of non-polymerizable carboxylic acids, alkyl esters of $\alpha,\beta$- ethylenically unsaturated carboxylic acids, monovinylidene aromatic monomers, α,β-ethylenically unsaturated nitriles and amides, ethylenically unsaturated ethers and ketones, and other ethylenically unsaturated monomers which polymerize across the ethylenic groups to form polymers having a linear carbon-to-carbon backbone molecular structure with a plurality of free hydrogen atoms attached to the chain and/or attached to carbon atoms of the substituents of the chain. Also included as suitable organic polymers are the thermoplastic condensation-type polymers exemplified by the polyamides such as nylon, the polyimides, the polyesters such as polyethylene, terephthalate, the polycarbonates such as the polyesters of carbonic acid and alkylidene diphenols; the polyethers such as polyformaldehyde and the like. Other organic polymers include thermoplastic addition type homopolymers, copolymers and mixtures of polymers of the following monomers: aliphatic mono-olefins having from 2 to 18 carbon atoms such as ethylene, propylene, butene-1 and isobutylene and the like; aliphatic conjugated dienes and trienes having from 4 to 20 carbon atoms such as butadiene, isoprene, heptatriene, monovinylidene aromatic monomers and the like. Other examples are taught in the literature such as in U.S. Pat. No. 3,770,706, Column 3, lines 14–53, the teachings of which are specifically incorporated herein by reference.

The particular polymer employed to make the plastic container is not critical to the practice of the invention provided the polymer is capable of being sulfonated.

The resinous orgainc polymers can be fabricated into various enclosure members by techniques well-known in the art.

In the practice of the sulfonation process of the present invention, the sulfonation of the interior surface of the plastic container is effected by a vapor phase process employing gaseous sulfur trioxide which may or may not be mixed with a suitable inert gas or with other reactive compounds such as a halogen e.g. fluorine, bromine, chlorine, or mixtures thereof.

In one aspect of the invention, gaseous sulfur trioxide is formed in situ in the interior of the container by placing a particulate form of a sulfur trioxide gas generating material into the interior of the container and thereafter gasifying the material to form sulfur trioxide. The gasifying technique includes heating a solid sulfur trioxide containing material, e.g., a pellet or pill, for example, by contact with radio frequency energy e.g., microwaves, employed at an energy level sufficient to gasify the material. Other methods of gasifying the material can be employed e.g., hot air, heating elements, infrared energy and the like.

One form of solid material which can be employed to generate sulfur trioxide is the solid polymerized form of sulfur trioxide itself. The sulfur trioxide polymer may be formed into pellets with a coating or casing of a suitable protective material. Suitable coatings include for example polytetrafluoroethylene and fluorochlorocarbon polymers such as polychlorotrifluoroethylene. Other suitable coatings include for example, elemental sulfur, tetrachlorophthalic anhydride, shellac modified by reaction with the tetrachlorophthalic anhydride and relatively high melting polyolefins such as polyethylene and the like. British Pat. No. 1,125,091 teaches various coated sulfur trioxide solids which can be employed in the practice of the present invention. Liquid sulfur trioxide can also absorb or be coated onto various inert substrates and permitted to solidify. Substrates such as inert clays, glass, and the like can be used.

In another aspect of the invention, the sulfonated interior of an enclosure member is treated with an agent which neutralizes the sulfonic acid groups on the polymer. Suitable neutralizing agents are taught for example in U.S. Pat. Nos. 3,613,957; 4,220,739, and 3,770,706, the teachings of which are specifically incorporated herein by reference.

In this aspect of the invention, it does not matter what technique has been employed to sulfonate the interior of the container. The neutralizing agent is employed in the form of solid material, e.g., a solid pellet or a pill-like material, which when suitably activated (e.g., sufficiently heated) produces a gas. For example, if it is desired to neutralize the sulfonated surface with ammonia, ammonium carbamate, ammonium bicarbonate, ammonium carbamate acid carbonate or the like, in a particulate form, may be inserted into the container and heated with radio frequency energy, for example microwaves, to form ammonia.

A preferred practice of the present invention is to employ solid gas generating materials for both the sulfonation and the neutralization steps.

The heating source employed in both the sulfonation and neutralization steps is preferably radio frequency energy, e.g., microwaves. Radio frequency of suitable wavelength to heat the sulfur trioxide source and the neutralizing agent is employed. The wavelength may vary depending on the particular material employed and the nature of the resinous organic polymer. Suitable wavelengths can easily be determined experimentally or from literature sources. For polymerized solid $SO_3$ a wavelength of from about $3 \times 10^{-2}$ to about $3 \times 10^4$ $cm^{-1}$ or about $10^{12}$ to about $10^6$ Hertz is suitable. A preferred wavelength is from about 3 to about 3,000 $cm^{-1}$ (about $10^{10}$ to about $10^7$ Hertz).

Temperature is not critical in carrying out the sulfonation or neutralization steps (other than activating the source materials). Temperatures within the range of about 0° C. to about 110° C., preferably from about 20° to about 40° C., are suitable.

The sulfonation and neutralization steps can be carried out at atmospheric, elevated pressures or under partial vacuum.

The amount of sulfur trioxide gas required for the surface area contacted can easily be determined from simple laboratory tests or from the teachings of the art. Sufficient gas should be employed to impart sufficient sulfonation to the polymer to provide the desired improved characteristics. For example, it is taught in U.S. Pat. No. 4,220,739 that the concentration of the sulfur trioxide should be sufficient in amount to provide a degree of surface sulfonation of the organic polymer in a range of from about 0.001 to about 50 milligrams of sulfur trioxide equivalence in the form of sulfonic acid groups per square centimeter of surface. Preferably from about 0.06 to about 10 milligrams per square centimeter is employed. The use of excess gas is desirable from the standpoint of speed of the sulfonation process. From about 1 to about 5 grams of $SO_3$ per liter of container volume is desirable.

As one illustration of the practice of the present invention, a gasoline tank formed of high density polyethylene is treated in the following manner. A sufficient amount of polymerized sulfur trioxide pellets are placed into the container. After the solid sulfur trioxide has been placed inside the container, the solids are heated employing a microwave generating source having a suitable energy output and wavelength to gasify the solid polysulfur trioxide to form sulfur trioxide gas. Following a sufficient contact time of about 5 to about 15 minutes, a neutralizing agent formed of solid ammonium carbonate is introduced into the container. The solid ammonium carbonate is subjected to sufficient microwave energy to form a gas which comprises ammonia, $CO_2$, and water. The ammonia will react with the sulfonic acid groups on the organic polymer to neutralize it to $-SO_3{}^-NH_4{}^+$. The ammonia also neutralizes unreacted $SO_3$ to form ammonium sulfamate. Upon cooling all free ammonia will combine with the excess $CO_2$ to form solid ammonium carbamate. Following the neutralization step the interior of the container can be rinsed with water to remove these secondary reaction products. All of the above steps can be carried out at atmospheric pressure and room temperature.

Improvement in the regularity and evenness of the surface treatment can be achieved by circulating air or an inert gas in the interior of the container during the sulfonation process and/or neutralizaton process. This can be accomplished, for example, by inserting a small fan into the interior of the container during the vaporization of the solid sulfur trioxide. Similar circulation techniques can be employed during the neutralization phase of the process. The container can also be closed after the insertion of the sulfonating agent and/or neutralizing agent thus resulting in a small pressure rise upon evaporation of the material. This will aid in treating the inner surface.

EXAMPLE 1

A one gallon cylindrical pail (formed of high density polyethylene) having a lid and formed of a linear low density polyethylene was treated as follows. The container was white in color. A five gram pellet of polymeric form of $SO_3$ was placed in the container and the lid placed thereon. No external source of heat was applied to the container. After a period of one hour the lid was removed and the interior of the container and lid had turned a light brown color indicating sulfonation of the interior of the container had taken place. A portion of the pellet remained and the area of the container closely adjacent to the pellet was darker in color evidencing a higher degree of sulfonation of the polyethylene.

EXAMPLE 2

A one quart zippered plastic bag made of polyethylene was treated as follows. A 0.5 gram portion of solid $SO_3$ was placed in a hollow microscope slide and covered with a flat glass slide. This was placed into the bag which was then closed. The bag was placed between the flat electrodes (20 mm spacing) of a microwave generator (Thermall ® brand microwave generator manufactured by W. T. LaRose and Associates Inc., Model EO-1 having a frequency of 60-80 Hertz). The $SO_3$ evaporated when subjected to about $\simeq 5$ seconds of microwave energy. Following the $SO_3$ treatment, 10 ml of an aqueous solution of ammonia was introduced into the bag and swirled around to neutralize the sulfonic acid groups on the polymer. The inside of the bag had turned an orange-brown color indicating sulfonation of the polyethylene.

EXAMPLE 3

A particulate $SO_3$ material was prepared in the following manner. Particles having a dimension of about 5 mm were prepared from microporous fired clay having about 50 percent by volume of voids. Other particles based on fumed silica (grade M5 Cab-O-Sil from Cabott Corp.) were also prepared. Liquid $SO_3$ was deposited in various amounts, onto the individual particles. Particles containing from about 50 to about 90 percent by weight of solid $SO_3$ were prepared. The liquid $SO_3$ solidified within a short period of time (about 10 sec) after being placed on the particles. Weight percent $SO_3$ was determined by dropping the $SO_3$ containing particle in water and titrating the resulting acidity.

The $SO_3$ prepared particles were evaluated for shelf life by noting the time it took the particles to fuse together. Fusing was caused by the $SO_3$ vapor given off by the particles forming needle-like crystals which bridge across the particles interconnecting them.

The so-prepared particles can be employed in the process of the invention as hereinbefore described.

What is claimed is:

1. An improvement in the method of sulfonating the interior surface of an enclosure member formed of a resinous organic polymer which is capable of being surface sulfonated when contacted with $SO_3$ vapors wherein the interior surface is contacted with a sufficient quantity of gaseous $SO_3$ to thereby form sulfonic acid groups along the backbone of the resinous organic polymer, the improvement which comprises: introducing into the interior of the enclosure member a solid particulate form of a sulfur trioxide and heating said solid material to form a sufficient quantity of sulfur trioxide gas to react with at least a portion of the interior surface of said enclosure member thereby forming said sulfonic acid groups attached to the resinous organic polymer.

2. The method of claim 1 wherein subsequent to said sulfonating step the sulfonic acid groups are neutralized.

3. The method of claim 2 wherein the sulfonic acid groups are neutralized with ammonia.

4. The method of claim 1 wherein the sulfonic acid groups are neutralized with ammonia.

5. The method of claim 1 wherein subsequent to the formation of the sulfonic acid groups a solid material, which upon heating forms a gas which is capable of neutralizing the sulfonic acid groups, is introduced into the interior of the enclosure member and subsequently heated to form a gas which neutralizes the sulfonic acid groups.

6. The method of claim 5 wherein the solid neutralizing material is an ammonium compound which upon heating forms ammonia vapors.

7. The method of claims 1, 2, 3, 4, 5 or 6 wherein heating is accomplished with radio frequency waves.

8. An improvement in the method of sulfonating the interior surface of an enclosure member formed of a resinous organic polymer which is capable of being surface sulfonated when contacted with $SO_3$ vapors wherein the interior surface is contacted with a sufficient quantity of gaseous $SO_3$ to thereby form sulfonic acid groups along the backbone of the resinous polymer and neutralizing sulfonic acid groups, the improvement which comprises: introducing a solid material, which upon heating forms a gas which is capable of neutralizing the sulfonic acid groups, into the interior of the sulfonated enclosure member and heating the solid material to form a gas which neutralizes the sulfonic groups.

9. The method of claim 8, wherein the solid material is an ammonium compound which upon heating forms ammonia vapors.

10. The method of claims 8 or 9, wherein the heating is accomplished by radio frequency waves.

* * * * *